(12) United States Patent
Greenfield et al.

(10) Patent No.: US 9,374,417 B1
(45) Date of Patent: Jun. 21, 2016

(54) DYNAMIC SPECIFICATION AUDITING FOR A DISTRIBUTED SYSTEM

(71) Applicant: Amazon Technologies, Inc., Reno, NV (US)

(72) Inventors: James Alfred Gordon Greenfield, Cape Town (ZA); Dirk Gerhardes Oberholster, Cape Town (ZA); Christopher Richard Jacques De Kadt, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 207 days.

(21) Appl. No.: 14/288,224

(22) Filed: May 27, 2014

(51) Int. Cl.
*G06F 15/16* (2006.01)
*H04L 29/08* (2006.01)
*G06F 15/177* (2006.01)

(52) U.S. Cl.
CPC .............. *H04L 67/10* (2013.01); *G06F 15/177* (2013.01)

(58) Field of Classification Search
CPC .................................................. G06F 11/2025
USPC ........................................................ 709/201
See application file for complete search history.

(56) References Cited

U.S. PATENT DOCUMENTS

| | | | |
|---|---|---|---|
| 6,047,219 A | 4/2000 | Eidson | |
| 6,289,502 B1 | 9/2001 | Garland et al. | |
| 6,336,148 B1 * | 1/2002 | Doong | G07F 17/0014 719/316 |
| 7,075,981 B1 * | 7/2006 | Clark | H04B 17/00 370/252 |
| 7,797,669 B1 | 9/2010 | Rehof et al. | |
| 7,890,543 B2 | 2/2011 | Hunt et al. | |
| 2003/0009253 A1 * | 1/2003 | McIntyre | G05B 23/0216 700/108 |
| 2003/0009540 A1 | 1/2003 | Benfield et al. | |
| 2008/0244492 A1 * | 10/2008 | Imai | G06F 17/5045 716/122 |
| 2010/0070970 A1 * | 3/2010 | Hu | G06F 9/45533 718/1 |
| 2013/0132933 A1 * | 5/2013 | Rajaram | G06F 11/3636 717/126 |
| 2014/0189062 A1 * | 7/2014 | Yan | G06F 9/54 709/218 |
| 2014/0359119 A1 * | 12/2014 | Spaven | H04L 67/26 709/224 |
| 2014/0379807 A1 * | 12/2014 | Spaven | H04L 67/26 709/204 |

\* cited by examiner

*Primary Examiner* — Hamza Algibhah
(74) *Attorney, Agent, or Firm* — Robert C. Kowert; Meyertons, Hood, Kivlin, Kowert & Goetzel, P.C.

(57) ABSTRACT

A distributed system may implement dynamic specification auditing. A specification for a distributed system may be maintained in a machine readable format. Specification assertion agents corresponding to different components of the distributed system may request and receive the specification in order to verify whether tasks performed by the respective component satisfy the specification. The specification assertion agents may then send assertions of the success or failure of the component to be stored in order to verify compliance with specification. Various reports may be generated which identify failures or components in the distributed system that are not reporting assertions.

20 Claims, 9 Drawing Sheets

DYNAMIC SPECIFICATION AUDITING FOR A DISTRIBUTED SYSTEM

BACKGROUND

Large-scale distributed systems are more popular than ever. Computational answers, solutions, services, data, or other items provided by distributed systems, as well various backbone services that support other operations, are many times implemented as a large scale distributed system. Large-scale distributed systems offer many advantages over traditional monolithic systems. Distributed systems may be scaled to meet the needs or demands on resources in the distributed system simply by connecting new systems to the network. The burden of many different tasks may be more efficiently subdivided and/or shared among the components of a distributed system. Redundancy, availability, and other benefits provided by greater numbers of computing systems or nodes performing tasks in distributed systems are also advantageous. Distributed systems are costly to develop and maintain. Interactions between multiple components are often complex and in many cases the effects of changes to a distributed system are difficult to predict.

Figure 1:
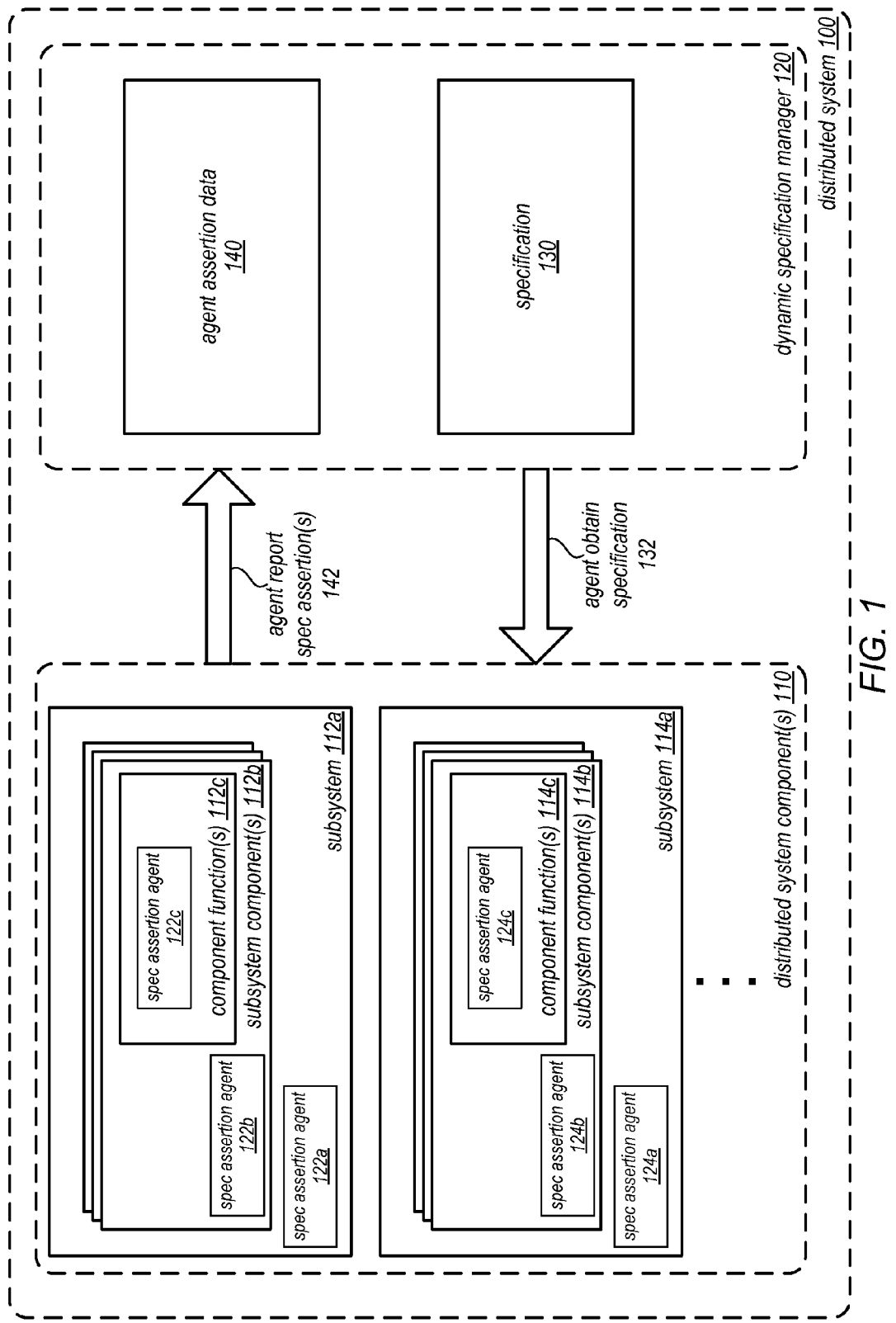
FIG. 1 is a block diagram illustrating a distributed system implementing dynamic specification auditing, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement dynamic specification auditing of distributed systems. Distributed system specifications may provide an authoritative guide for developing and maintaining distributed systems that often cover large number of systems, components, and devices. Complex interactions may be regulated and defined, and new features, components, or other changes may be clearly outlined. The requirements of a specification thus may describe the optimal or approved operation for components implementing a distributed system. However, as changes are made to the specification, not all components may be brought up to compliance with the specification. Many systems are often implemented by multiple development teams, each of which may have to account for changes made by other development teams. Without knowledge of these changes, development teams for some components of a distributed system may fail to incorporate changes made by others. Overtime signification errors and performance problems may arise when the specification is not enforced among the components of a distributed system.

Static evaluation techniques may be used to pre-test new components or old components of a distributed system when changes are made to a distributed system specification. However, if particular components are not tested and unintended affects arise, wide-spread failures may have to occur before uncompliant components are identified. Moreover, for large-scale distributed systems, different developers may test and implement changes or features specific to a component without ways to determine how the implemented changes affect other components. Dynamic specification auditing for distributed systems allow for continuous and dynamic identification of compliance for distributed systems. This may effectively allow for an ongoing regression test of the effects of specification change (as may be made for changes to the distributed system). For example, distributed systems with large numbers of independent developers, administrators or other actors upon the system may be able to implement changes secure in the knowledge that other developers may be notified and able to account for the changes. Furthermore, other testing techniques or approaches may also benefit from dynamically auditing the specification. Integration testing for new features, for example, may utilize dynamic auditing to easily recognize potential problems or conflicts between new features and how things currently are implemented or operating.

FIG. 1 is a block diagram illustrating a distributed system implementing dynamic specification auditing, according to some embodiments. Distributed system 100 may be implemented by a multiple systems, components, or devices, such as computing system 1000 described below with regard to FIG. 9. Distributed system may implement multiple different distributed system components 110, such as subsystem 112a and subsystem 114a. Different distributed system components 110 may be implemented at varying levels in a distributed system architecture, such as subsystem components 112b and 114b in subsystems 112a and 114a respectively. Lower still, particular component functions 112c and 114c may be implemented within other components, such as subsystem components 112b and 114b respectively.

In order to define the various roles, operations, states, and other tasks performed by distributed system components 110, a distributed system specification 130 may be defined. Distributed system 100 may implement dynamic specification auditing techniques, as described in more detail below with regard to FIGS. 2-8. As illustrated in FIG. 1, distributed system 100 may implement dynamic specification manager 120. Dynamic specification manager 120 may provide access to the specification 120 and track the compliance with the specification by maintaining assertions 140 reported by multiple specification assertion agents for different distributed system components 110.

Specification assertion agents may be implemented to monitor and report the compliance of different respective distributed system components 110. For example, specification assertion agents 122a and 124a may report on the compliance of subsystems 112a and 114a respectively. Specification assertion agents 122b and 124b may monitor the compliance of subsystem components 112b and 114b respectively, while specification assertion agents 122c and 124c may monitor the compliance of component functions 112c and 114c respectively. Implementing specification assertion agents across different levels of components 110 may allow for both fine-grained and coarse-grained auditing of specification compliance.

As illustrated in FIG. 1, agents may obtain 132 specification 130. Specification 130 may be maintained in a machine readable format so that specification agents may parse through the specification, identify applicable requirements, and verify compliance with the identified requirements. Agents may then report compliant or non-compliant assertions 142 to be maintained in agent assertion data 140. Various reports may be generated based on agent assertion data to understand the compliance and coverage of a specification or updated specification. Alarms of particular failures may be triggered in some embodiments and notifications of the failures sent to responsible parties (e.g., administrators or developers).

Please note that previous descriptions are not intended to be limiting, but are merely provided as an example of a distributed system and dynamic specification auditing. Various other components or arrangements of components may make up a distributed system and/or dynamic specification manager.

This specification next includes a general description of a virtual computing resource provider, which may implement dynamic specification auditing for distributed s systems. Then various examples of a dynamic specification manager are discussed, including different components/modules, or arrangements of components/module that may be employed as part of implementing a dynamic specification manager. A number of different methods and techniques to dynamic specification auditing for distributed s systems are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
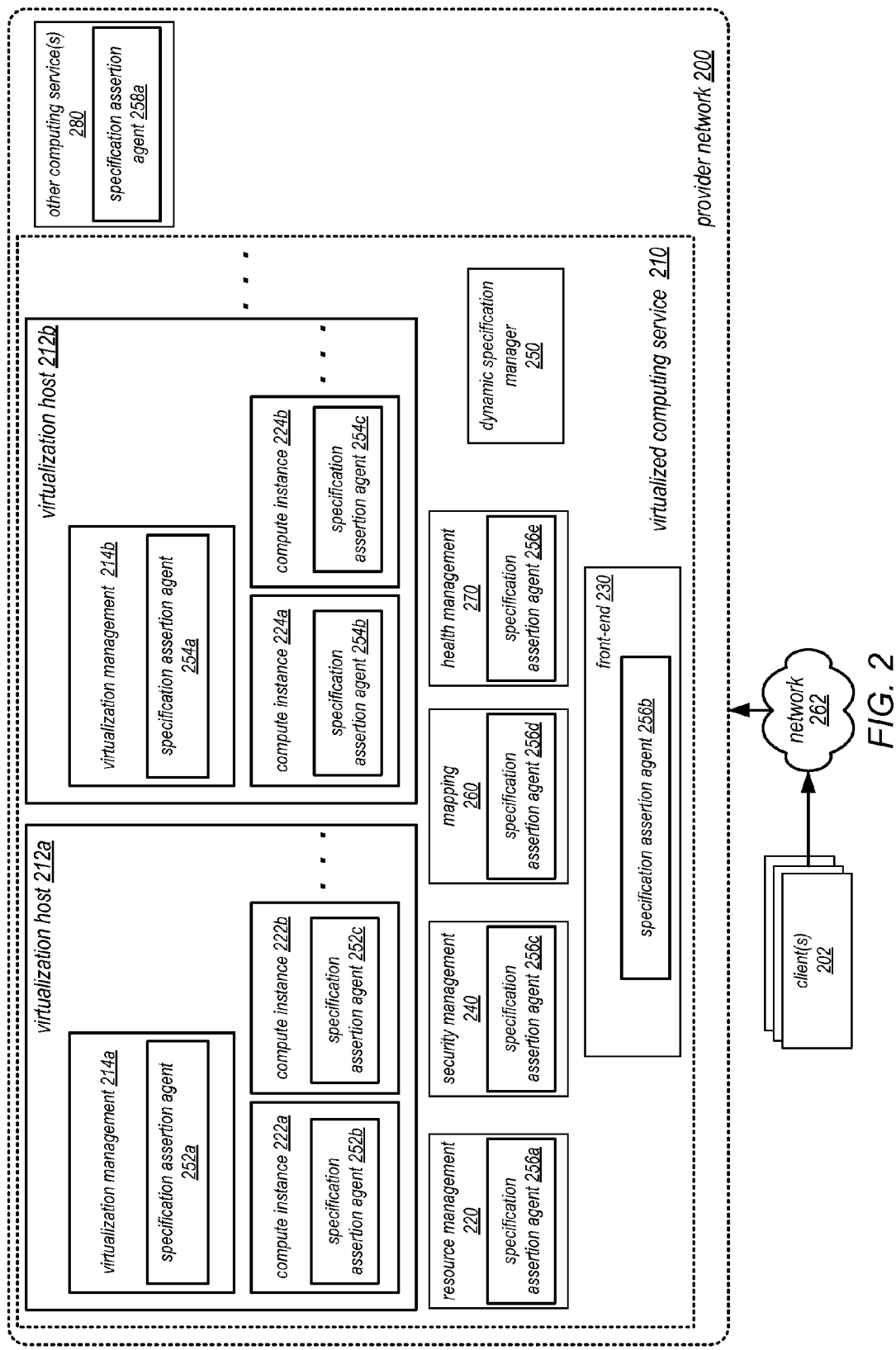
FIG. 2 is a network-based virtualized computing service implementing dynamic specification auditing, according to some embodiments.

FIG. 2 is a network-based virtualized computing service implementing dynamic specification auditing, according to some embodiments. Provider network 200 may be set up by an entity such as a company or a public sector organization to provide one or more services (such as various types of cloud-based computing or storage) accessible via the Internet and/or other networks to clients 202. Provider network 200 may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may provide computing resources. These computing resources may in some embodiments be offered to clients in units called "instances," 222a, 222b and 224a, 224b such as virtual or physical compute instances or storage instances.

A virtual compute instance 222 and 224 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 222a, b and 224a, b of provider network 200 in different embodiments, including general purpose or special purpose computer servers, storage devices, network devices and the like. In some embodiments instance clients 202 or other any other user may be configured (and/or authorized) to direct network traffic to a compute instance 202.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 202 applications, without for example requiring the client 202 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Figure 9:
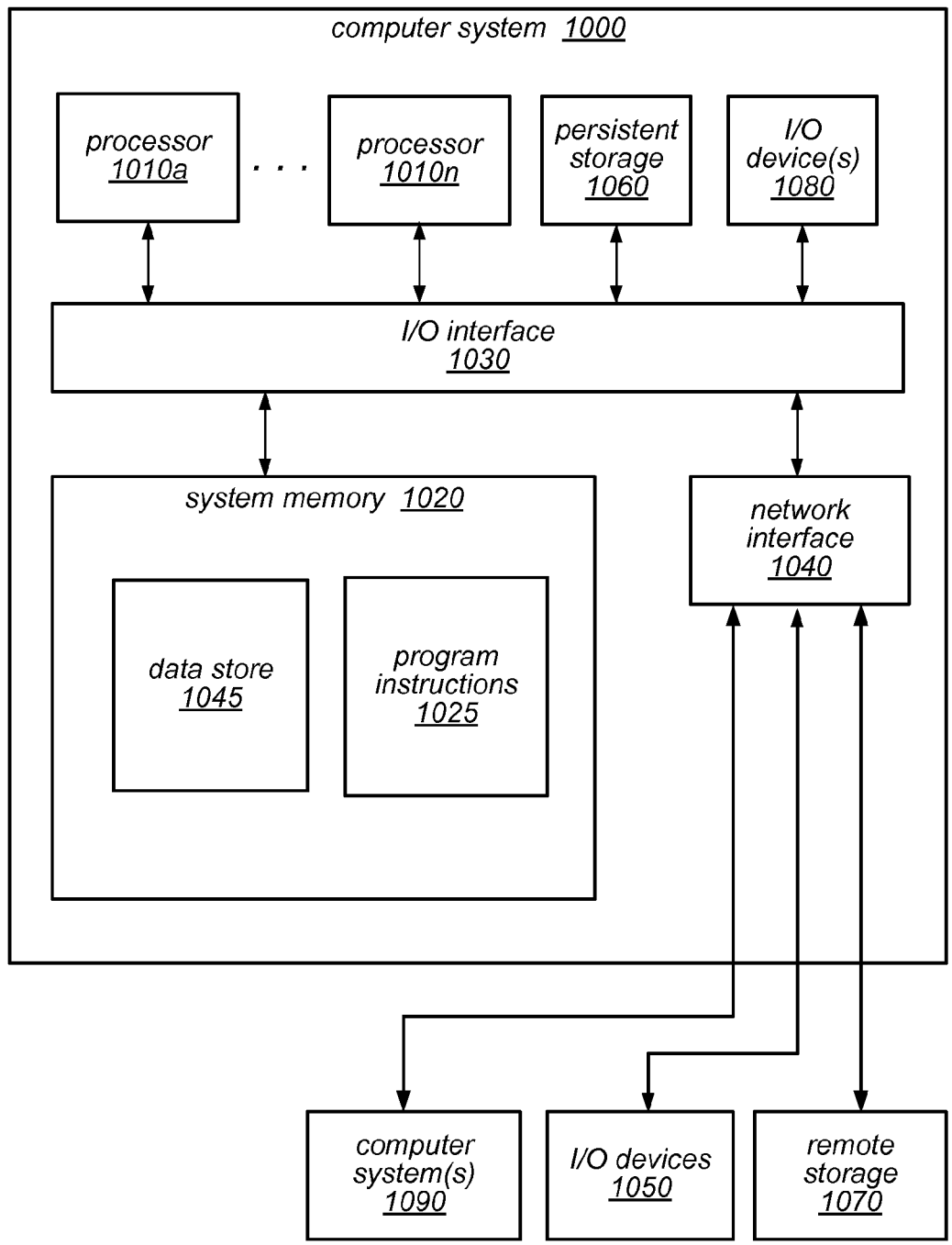
FIG. 9 is a block diagram illustrating an example computing system, according to some embodiments.

As illustrated in FIG. 2, a virtualization host, such as virtualization hosts 212a and 212b, may implement and/or manage multiple compute instances 222a, 222b, 224a, and 222b respectively, in some embodiments, and may be one or more computing devices, such as computing system 1000 described below with regard to FIG. 9. A virtualization host may include a virtualization management module, such as virtualization management modules 214a and 214b capable of instantiating and managing a number of different client-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by clients on whose behalf the compute instances run, but may instead be responsible for various administrative or control-plane operations of the network provider, including handling the network traffic directed to or from the compute instances.

As illustrated in FIG. 2, each of these components in virtualization hosts, virtualization management, and compute instances may implement respective specification assertion agents, such as specification assertion agents 252a, 252b, 252c, 254a, 254b, and 254c. Other services or subsystems may be implemented, such as resource management 220 (which may assign compute instances, determine which instance configurations are valid, provision more resources, etc.), security management 240 may implement security groupings, such as virtual private networks, mapping component 260, which may provide a mapping and encapsulating system for creating an overlay network on network and may provide a separate namespace for the overlay layer and the internal network layer in provider network 200, health management 270, which may monitor, suspend, provision, or alert on the health status of various compute instances, and front-end 230 which may handle requests from clients 202, directing them to the appropriate internal services in virtualized computing service 210. These subsystems and services may also implement respective specification assertion agents, such as agents 256a, 256b, 256c, 256d, and 256e. External computing services, such as other computing services 280 may also be leveraged to provide virtual computing service 210 (e.g. a storage service). Other computing service(s) 280 may also implement a respective specification assertion agent 258a.

Virtualized computing service 210 may implement dynamic specification manager 250, described in more detail below to manage the dynamic auditing of a specification for virtualized computing service 210, as well as handling new versions or updates to the specification. The specification may be provided to specification assertion agents, which in turn may verify compliance of the specification during the performance of component tasks, and provide assertion results back to dynamic specification manager 250.

Clients 202 may encompass any type of client configurable to submit requests to provider network 200. For example, a given client 202 may include a suitable version of a web browser, or may include a plug-in module or other type of code module configured to execute as an extension to or within an execution environment provided by a web browser. Alternatively, a client 202 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 202 in a manner that is transparent to applications implement on the client 202 utilizing computational resources provided by the compute instance.

Clients 202 may convey network-based services requests to provider network 200 via external network 260. In various embodiments, external network 260 may encompass any suitable combination of networking hardware and protocols necessary to establish network-based communications between clients 202 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 202 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and provider network 200. It is noted that in some embodiments, clients 202 may communicate with provider network 202 using a private network rather than the public Internet.

Figure 3:
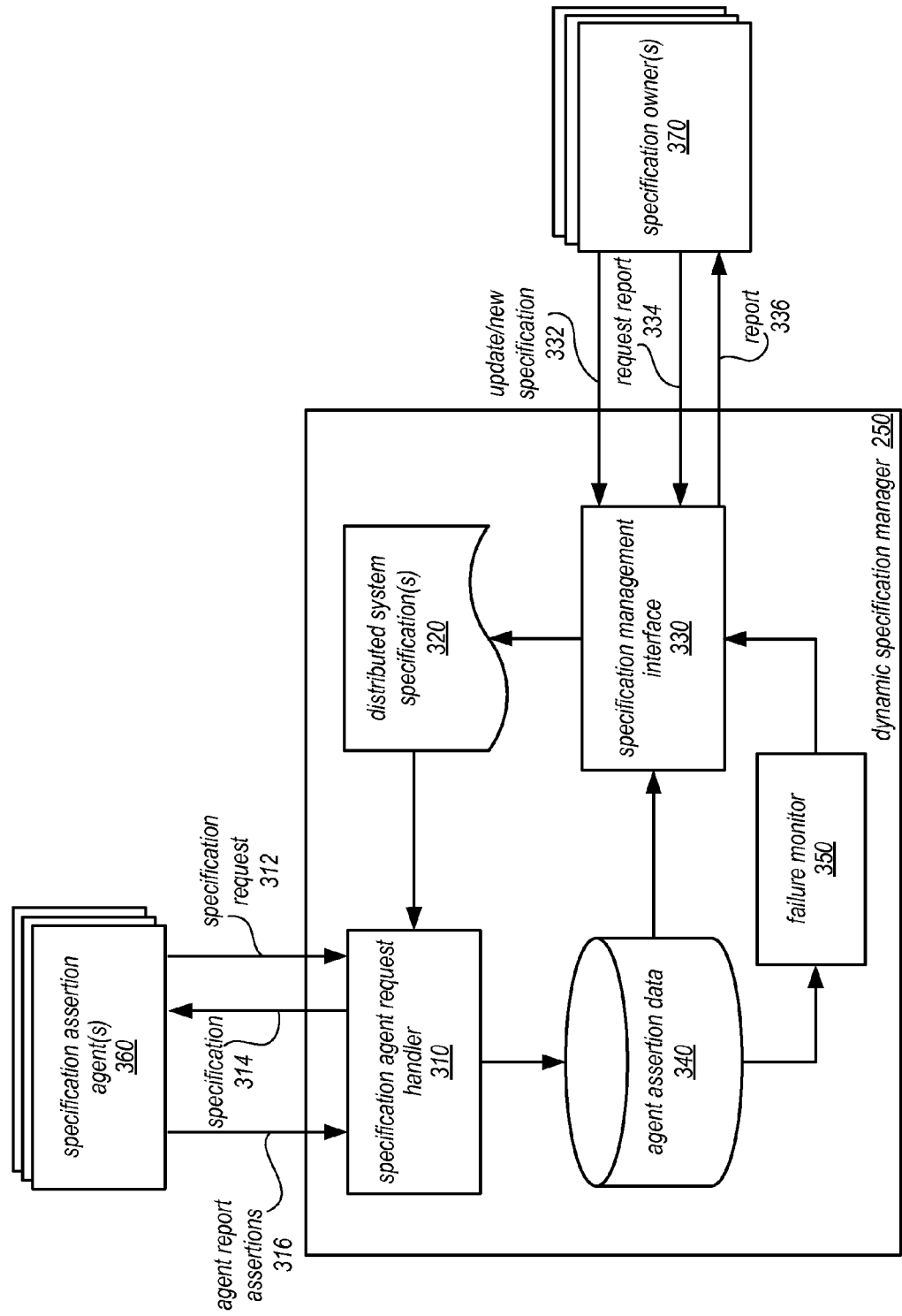
FIG. 3 is a block diagram illustrating a dynamic specification manager, according to some embodiments.

FIG. 3 is a block diagram illustrating a dynamic specification manager, according to some embodiments. Distributed specification manager 250 may be configured to maintain a specification for a distributed system, control access to the specification, maintain agent assertions of compliance with regard to the specification, as well as handle access to and interactions with the assertion data. Please note that FIG. 3 is provided as logical illustration of a dynamic specification manager as not intended to be limiting as to the number, arrangement, or location of various components for implementing dynamic specification auditing. Where single components are illustrated, multiple components may be utilized to implement the same functionality or component in some embodiments. In some embodiments, the varying components may be distributed across multiple different systems. For example a storage system may maintain (together or separately) agent assertion data and the specification. Interactions with agent assertion data or specification may be managed according to the standard I interface or controls for the storage system (e.g., a programmatic interface). Whereas failure monitors may be implemented individually for different development teams or subsystems within the distributed system. Dynamic specification manager may be implemented by various combinations of hardware and/or software on one or more computing systems or nodes, such as computing system 1000 described below with regard to FIG. 9.

Figure 8:
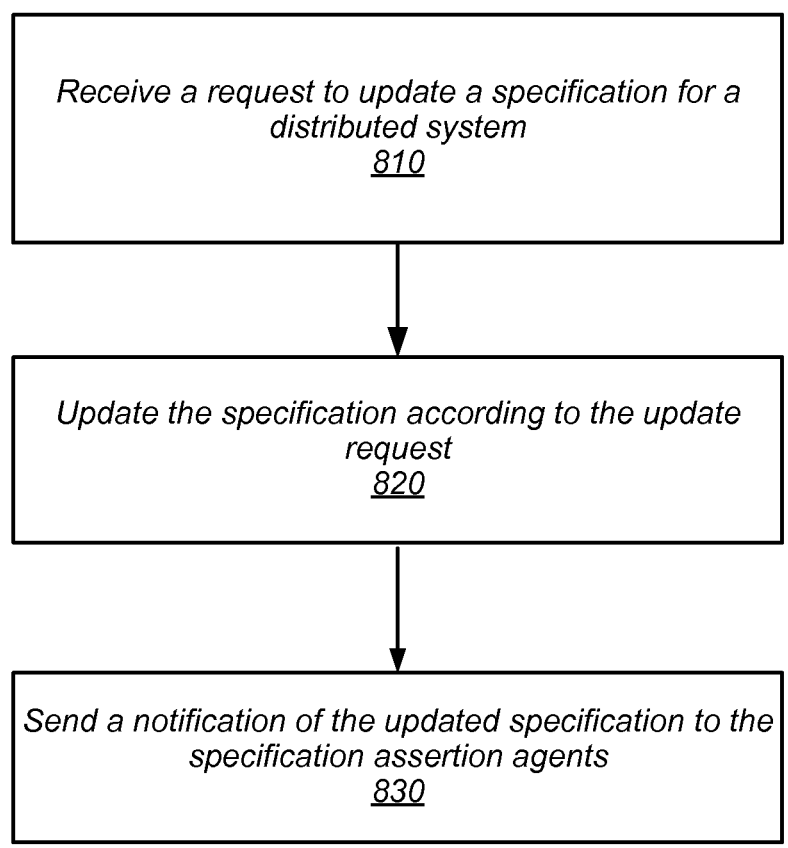
FIG. 8 is a high-level flowchart illustrating various methods and techniques for handling updates to a specification for dynamic auditing, according to some embodiments.

In some embodiments, dynamic specification manager 250 may implement specification management interface 330. Specification management interface 330 may act as an interface, coordinator, and/or manager for specifications maintained for a distributed system. In at least some embodiments, specification management interface 330 may be a network-based interface which may receive and respond to requests over the network, such as through requests formatted according to a programmatic interface (API) or network-based site that provides a graphical user interface via which requests may be received and responses provided. For instance, specification owners 370 (which may be client devices operated by distributed system developers or administrators) may be configured to provide a new specification or updates to a specification 332 to specification management request handler 330. For example, an update request to change a specification or use a new specification may be received via the interface 330. Specification management interface 330 may in turn store the new version or update distributed system specification(s) 320 as requested. FIG. 8, discussed below, describes various requests or techniques that may be implemented for performing updates to specifications. Specification management interface 330 may also handle requests for compliance reports 334, obtaining the requested agent assertion data 340, evaluating the data, generating the report, and sending back the report 336 to specification owner(s). In some embodiments, specification management interface 330 may also notify specification owners if certain alarms are triggered by failure monitor 350. For example, specification management interface 330 may provide a network-based site that allows specification owners, to configure various alarms, reports, and other information gather from the assertion data. Different views, whether graphic, textual, or other arrangements of compliance reporting may be selected, such as displaying color-coded versions of the specification so that components that are not compliant with the specification (or not reporting at all) may be identified. In a large-scale development environment, various access control policies or other similar techniques may allow authorized users to access or utilize a few, some or all of the various capabilities of dynamic specification manager 250. Moreover, changes to the specification may be tracked, as well as which particular user made the changes for subsequent analysis.

Dynamic specification manager 250 may also maintain the specification 320 for the distributed system, in some embodiments. Different versions of the specification may be maintained, in some embodiments. Distributed system specification(s) 320 may be maintained in a machine-readable format such that specification assertion agent(s) 360 may be able to parse the specification.

Dynamic specification manager 250 may also implement a specification agent request handler 310 to service requests from specification assertion agent(s) 360. For example, specification assertion agents 360 may send requests for the specification 312 to specification agent request handler 310. Specification agent request handler 310 may obtain the distributed system specification 320 and provide the specification 314 to specification assertion agent(s) 360. Specification agent request handler 310 may also receive and storage agent reported assertions 316 in agent assertion data 340, which may be a persistent data store.

Figure 4:
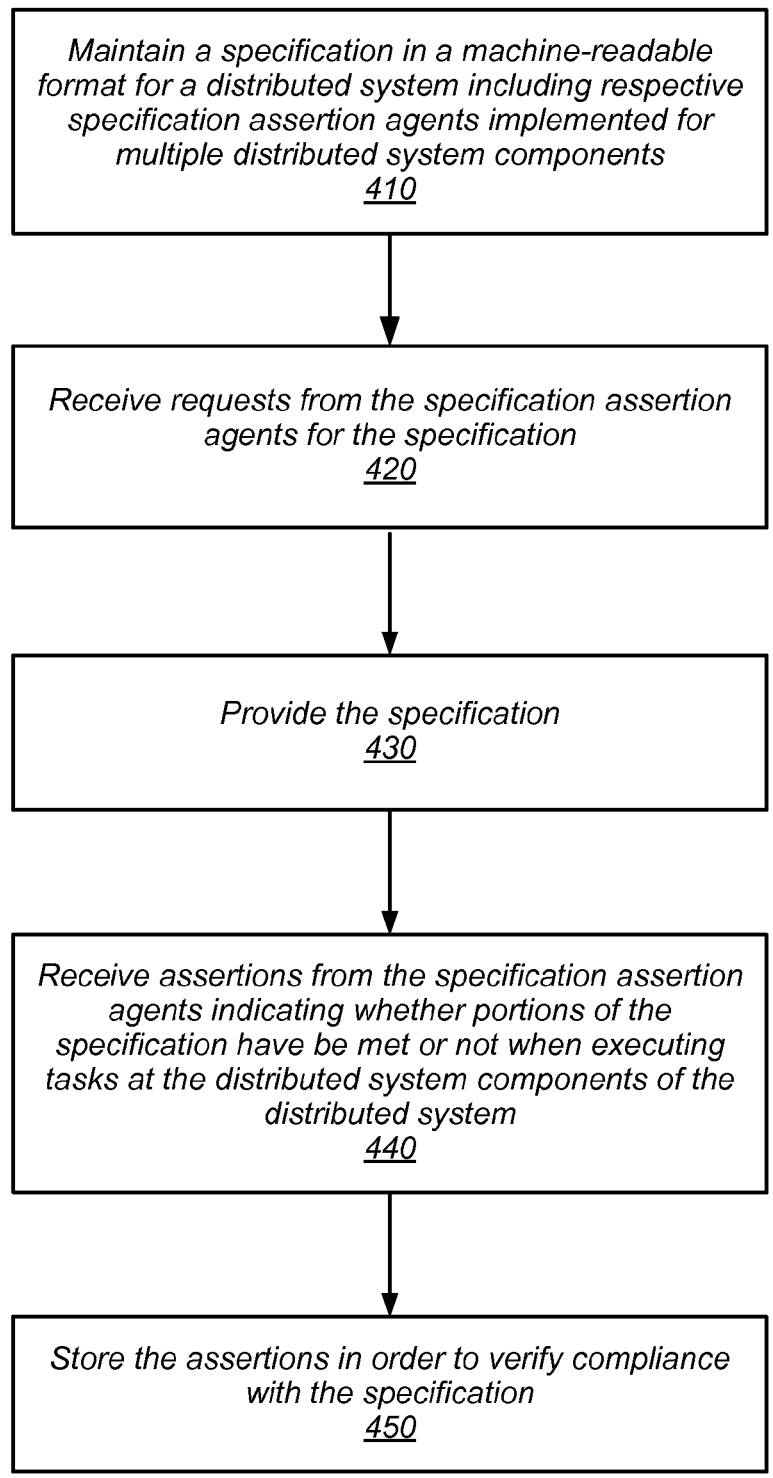
FIG. 4 is high-level flowchart illustrating various methods and techniques for dynamic specification auditing for distributed systems, according to some embodiments.

The examples of implementing a dynamic specification auditing for distributed systems discussed above with regard to FIGS. 2 and 3 have been given in regard to virtual computing resources offered by a provider network. Various other types or configurations of distributed systems or services may implement these techniques. Distributed database systems, content delivery networks, storage systems, or any other large-scale distributed system may implement dynamic specification auditing. FIG. 4 is high-level flowchart illustrating various methods and techniques for dynamic specification auditing for distributed systems, according to some embodiments. These techniques may be implemented using various components or nodes of a distributed system.

As indicated at 410, a specification for a distributed system may be maintained in a machine-readable format for a distributed system, in various embodiments. Machine-readable formats may include, but are not limited to JavaScript Object Notation (JSON) and Extensible Markup Language (XML), or any other format for which specification assertion agents can digest, parse, interpret, otherwise identify the specification requirements corresponding to the distributed system component monitored. Various different types of data stores and/or persistent storage devices may be implemented to maintain the specification. Object stores, for instance may provide storage for the specification as versioning techniques may allow multiple different versions of a specification to be maintained that correspond to different points in time. The distributed system may itself include multiple different components operating at varying levels within the architecture of the distributed system. For example, as illustrated above in FIG. 1 both a distributed system may include large sub-systems or services (which may or may not be internal to a network for the distributed system). Specification assertion agents may be implemented for these different components of the distributed system in order to very compliance of the tasks performs or states of these components with the specification.

As indicated at 420, requests may be received from the specification assertion agents for the specification, and in response the specification may be provided, as indicated at 430. Although not illustrated, in some embodiments only those portions of the specification relevant to the distributed system component for which a specification assertion agent performs verification may be supplied.

Assertions may be received from some of the specification assertion agents, as indicated at 440. In various embodiments, these assertions may indicate whether the corresponding portion(s) of the specification are met (success/failure, compliance/non-compliance) at the particular component when executing tasks at the distributed system components of the distributed system. Timestamps and other metadata descriptive of the assertions may also be received along with the assertions. Received assertions may then be stored in order to verify compliance with the specification, as indicated at 450. Monitoring techniques that may trigger alarms based on compliance or non-compliance may be implemented using the stored assertions, as discussed below with regard to FIG. 7. Similarly, compliance reports and other views of the stored assertions may be generated and provided for further compliance analysis, as discussed below with regard to FIG. 6. The assertions themselves may be stored in the same data store or storage devices as the specification or located differently in another data store or other storage devices.

Figure 5:
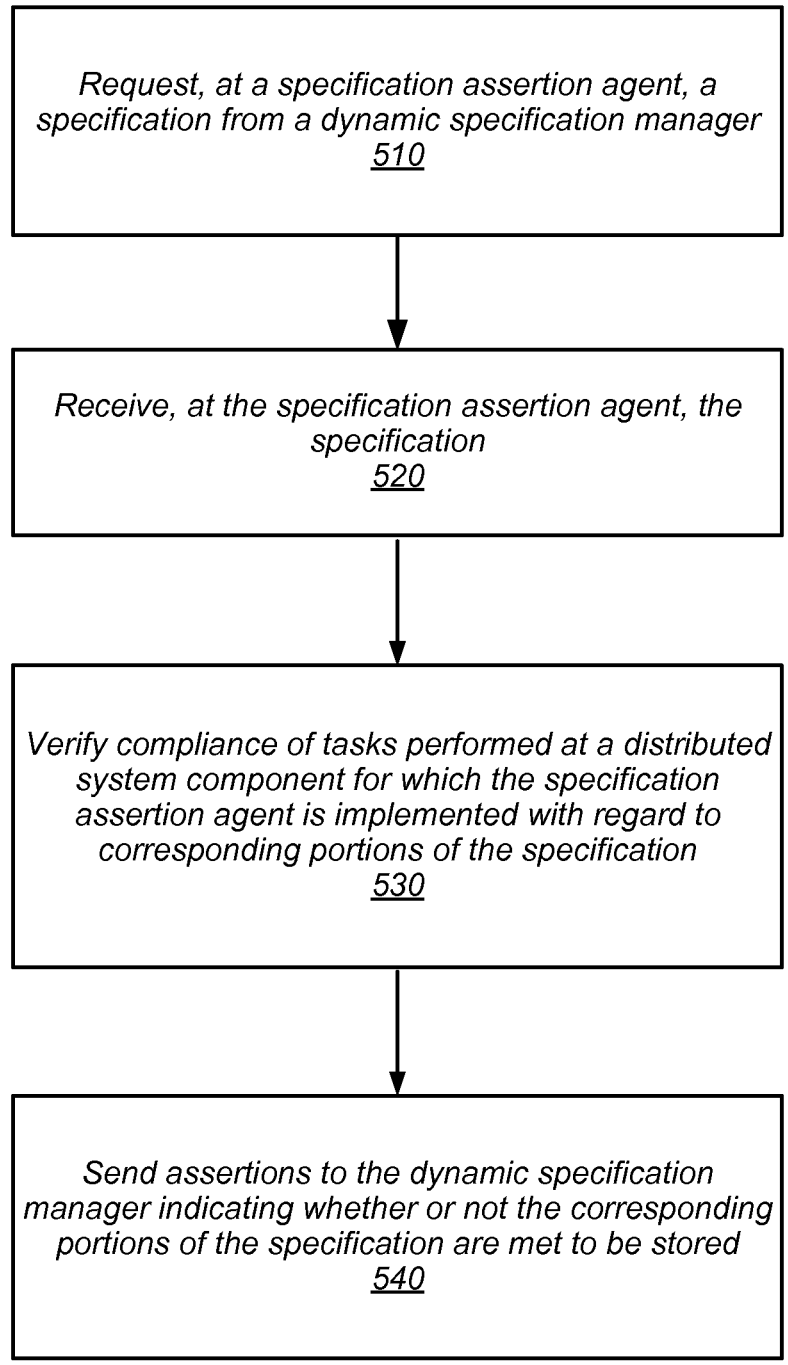
FIG. 5 is high-level flowchart illustrating various methods and techniques for verifying specification compliance for particular distributed system components at a specification assertion agent, according to some embodiments.

Specification assertion agents, as discussed above with regard to FIGS. 1 and 2, may be implemented at various levels, components, or locations within a distributed system. Some specification assertion agents may monitor the compliance of tasks that are performed at a very high volume, but in a limited number of locations, whereas other specification assertion agents may be implemented at many components performing the same task, with each individual component monitoring a much smaller volume of tasks. Although each specification assertion agent may receive the same specification information and report assertions in the same format, the implementation task compliance verification may vary among specification assertion agents dependent on the task/component being monitored. FIG. 5 is high-level flowchart illustrating various methods and techniques for verifying specification compliance for particular distributed system components at a specification assertion agent, according to some embodiments.

As indicated at 510, a request may be sent from a specification assertion agent for a specification of the distributed system to a dynamic specification manager or other component maintaining the specification, in some embodiments. The specification document may then be received at the specification assertion agent, as indicated at 520. The specification assertion agent may be configured to parse the specification document in order to identify those portion(s) of the specification that are relevant to the component for which the assertion agent is verifying compliance. For example, the specification assertion agent may parse the specification document for certain key value pairs (e.g., if the specification is in JSON) or tags (e.g., if the specification document is in XML).

Once the relevant portions of the specification are identified, then compliance of tasks performed at the distributed system component for which the specification assertion agent is implemented may be verified, as indicated at 530. For example, if only certain resources may be configured in certain way by a particular task, then the specification document may indicate valid configurations. For configurations that were made and identified as invalid, an assertion indicating the component, failure or non-compliance of the task, and other error information may be generated. Similarly, if the task is successfully performed, then an assertion of success or compliance may be generated. Timestamps and other metadata information may also be included. In another example, the specification may define particular parameters for performing operations, such as throttling parameters for a throttle component that limits the number of requests to a particular resource. If the throttle parameter is incorrectly set, then a non-compliant or failure assertion may be generated. Determinations of compliance may vary as the tasks may vary, and thus the previous examples are not intended to be limiting as to other ways in which the verification of task compliance with regard to a specification may be performed.

Assertions of compliance and non-compliance may be sent to the dynamic specification manager, or other component, for storage, as indicated at 540 in various embodiments. As noted above, the assertions may include other information, such as a timestamp, or other metadata descriptive of the task or assertion. Different specification assertion agents may perform compliance verification differently and independently. In this communications between specification assertion agents and a dynamic specification manager or other system or component maintaining the specification and/or storing assertion information may be loosely coupled and asynchronous. Some specification assertion agents may request and receive the specification and never complete task compliance or sending of assertions. Specification assertion agents may be implemented among distributed system components to verify task compliance in such a way as not to interfere with the performance of the components themselves.

Figure 6:
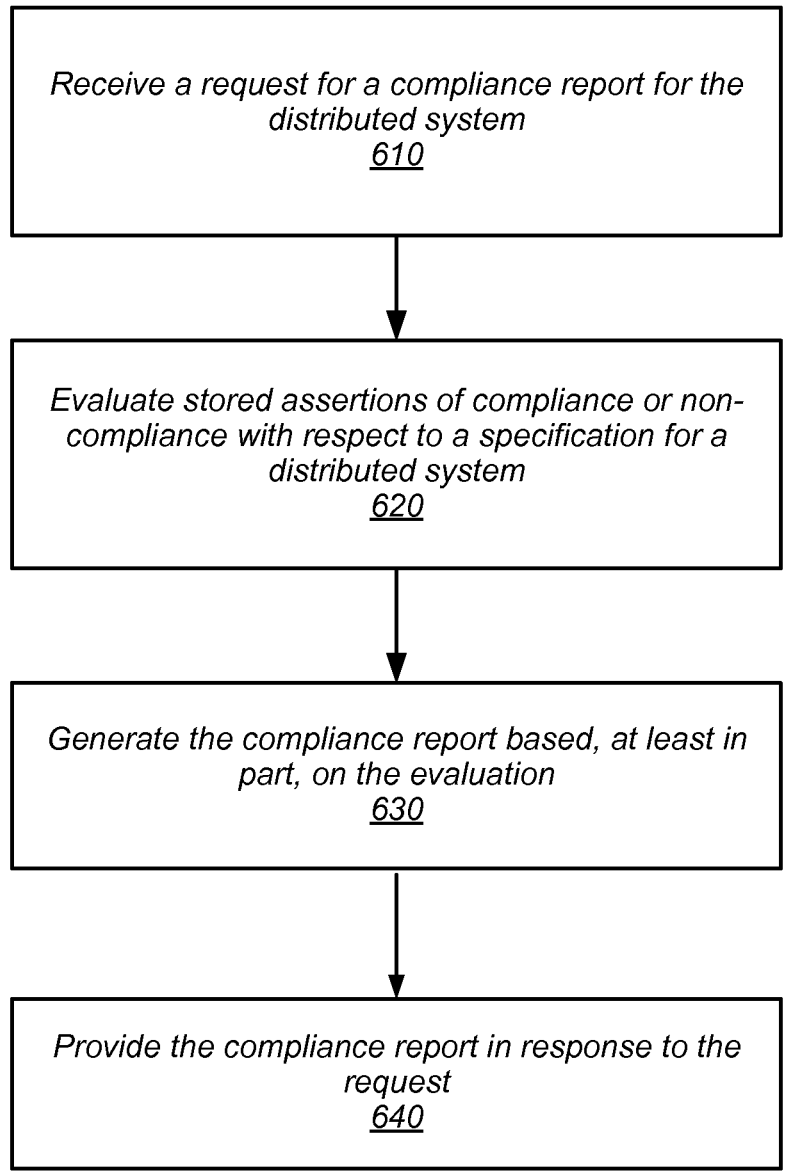
FIG. 6 is high-level flowchart illustrating various methods and techniques for generating compliance reports with regard to a specification for which dynamic auditing has been performed, according to some embodiments.

For large distributed systems with large amounts of assertion data it may be difficult to view compliance of specific portions of the distributed system, or of the distributed system as a whole by sampling viewing the raw assertion data. In some embodiments, compliance reports or other aggregation and analysis of the assertion data may be provided so as to quickly provide a more comprehensible view of compliance with the specification. FIG. 6 is high-level flowchart illustrating various methods and techniques for generating compliance reports with regard to a specification for which dynamic auditing has been performed, according to some embodiments.

As indicated at 610, a request for a compliance report may be received, in some embodiments. The compliance report may request evaluation of specific components or portions of the distributed system (e.g., particular resources, or particular layers of the distributed system architectural stack). The request may also include various types of analysis requests or formatting requests for the compliance report. For example, the request may wish to view successful or failing assertions over a period of time, graphically, or the request may ask for current compliance percentages or rates for different types of components or the distributed system as a whole.

As indicated at 620, an evaluation of the assertion data that is stored may be performed, in some embodiments. For example, assertion data for the specifically requested components or portions of the data may be accessed, as well as assertion data within a specific range of time. Based on the evaluation, the compliance report may be generated as indicated at 630. For example, a document, table, spreadsheet, or graph may be created which represents the requested report. In some embodiments, a compliance report may provide a human-readable presentation of the specification (e.g., the machine readable document annotated with metadata or other information describing the values in the specification). This human-readable version of the specification may be color coded so that compliant portions are colored one way, failing or incompliant portions are colored another away, and unknown portions of the specification (e.g., where for example no assertions have been received) may be colored a third way.

Once generated, the compliance report may be provided in response to the request, as indicated at 640. For example, the report may be emailed, downloaded, or displayed. In some embodiments, a network-based interface (e.g., a website) may display reports and other results, as well as receive requests, or set up monitoring for particular failures.

Figure 7:
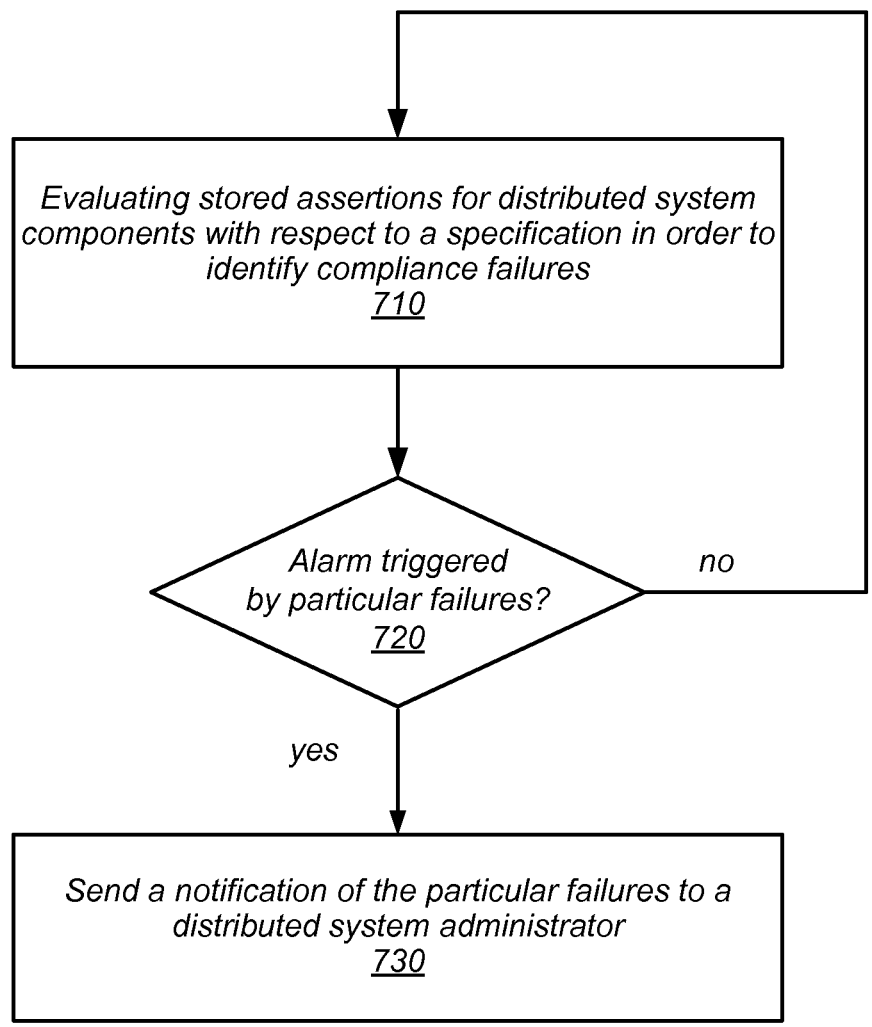
FIG. 7 is a high-level flowchart illustrating various methods and techniques for monitoring failure assertions in order trigger failure alarms, according to some embodiments.

Results of dynamic specification auditing may be useful for automated or proactive monitoring of compliance failures. Although illustrated in FIG. 3 above implemented as part of a dynamic specification manager 250, monitoring techniques may be implemented separately by different systems (e.g., monitors for different components that are customizable by administrators/developers responsible for that particular portion of the distributed system). FIG. 7 is a high-level flowchart illustrating various methods and techniques for monitoring failure assertions in order trigger failure alarms, according to some embodiments.

As indicated at 710, storage assertions for distributed system components with respect to a specification may be evaluated in order to identify compliance failures, in various embodiments. For instance, assertions stored for specific components or associated with specific levels within the distributed system architecture or software stack may be targeted for evaluation. All assertions with regard to front end services, such as request handling, for example, may be evaluated. In another example, assertions stored with regard to a particular low-level component, such as a component that throttles traffic to a specific type of resource or node in the distributed system may be monitored. By selecting particular components, types of components, functions, or even larger groups of components associated with a particular portion of the distributed system, monitoring may be tuned to provide fine-grained alerts for lower-level functions accomplished by specific distributed system components all the way to coarse-grained alerts which may provide an indication of the overall performance or compliance of the distributed system.

In various embodiments, a determination may be made as to whether failures assertions in the evaluated assertions are sufficient to warrant trigger an alarm for the failures, as indicated 720. For instance, some types of failures may so singular, or harmful, that a single occurrence of failure to comply with the specification may trigger an alarm. For example, specification changes that update security features or controls for the distributed system may always trigger alarms if the specification is not complied with. For some failures, a threshold of failures may need to be met or surpassed in order trigger an alarm. For example, if most components of a same type perform tasks in compliance with the specification, and a small number of the type of components do not, then it may be surmised that hardware discrepancy or obsolesce issue may be causing the failure assertions.

When alarms are triggered, as indicated by the positive exit form 720, a notification or some other indication may be provided to a distributed system administrator, as indicated at 730, developer, or other responsible party. In some embodiments, alarms may be logged when triggered so as to create a record of failures or patterns of failures that are noted. If no alarms are triggered, as indicated by the negative exit from 720, then monitoring may continue, in various embodiments.

New features, components, modifications, or changes to a distributed system all may instigate corresponding changes to a specification used for dynamic auditing. Different testing approaches may dictate how and when portions of the specification are changed. For example, a regression testing approach for the distributed system may select different portions of the specification to update in order to regression test the effect of a change or new component on other components that correspond to the update portions of the specification. FIG. 8 is a high-level flowchart illustrating various methods and techniques for handling updates to a specification for dynamic auditing, according to some embodiments.

As indicated at 810, a request to update a specification for a distributed system may be received. The request may describe or include new portion of the specification to add or insert, a portion of the specification to remove or delete, or a portion of the specification to modify or change. As the specification may be stored in a machine readable format, these update requests may be formatted according to a programmatic interface (API) that may allow a specification management component, such as dynamic specification manager 120 or 250 described above with regard to FIGS. 1 and 2, to make a fine-grained update to the specification, as the specification document itself may be parsed or traversed to locate the specific portions to update. In some embodiments, update requests may simply include a new version of the specification to replace the older version.

In various embodiments, the update to the specification may be performed according to the update request, as indicated at 820. For instance, the addition, deletion, or modification may be made to the specification document. In some embodiments, changes to the specification may be logged, or multiple versions of the specification may be kept, in order to facilitate dynamic auditing for different versions of the specification or different states of the specification at a specific point in time. In this way, more sophisticated deployment and/or testing schemes may be able to employ dynamic specification auditing for particular or targeted purposes.

As indicated at 830, a notification of the update to the specification may be sent to the specification assertion agents, in some embodiments. For example, a notification including a new specification version number may sent out, which may indicate to some specification assertion agents utilizing a prior version of the specification that their own respective copy of the specification may be obsolete. Instead of a notification, in some embodiments, the updated specification document itself may be sent out to the specification assertion agents. Alternatively, specification assertion agents may discover the update to the specification independently from any update notification. For example, in some embodiments, specification assertion agents may periodically, or aperiodically, poll to determine whether updates to the specification have been made. A new version number or timestamp associated with the specification document may indicate that newer version of the specification is available, which the specification assertion agents may then request.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments of dynamic specification auditing for distributed systems as described herein may be executed on one or more computer systems, which may interact with various other devices. FIG. 9 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the data warehouse system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a virtual computing resource provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
   a data store configured to maintain a specification for the distributed system in a machine-readable format;
   a data store configured to maintain assertions indicating whether a portion of the specification is met or is not met;
   a plurality of computing nodes configured to implement a plurality of different distributed system components that together implement a distributed, network-based service, wherein a respective specification assertion agent is implemented for each of the plurality of different distributed system components;
   one or more computing nodes configured to implement a dynamic specification manager;
   the dynamic specification manager, configured to:
      for each of a plurality of requests from different ones of the respective specification assertion agents for the plurality of different system components:
         access the data store maintaining the specification;
         send at least some of the specification to each of the different ones of the respective specification assertion agents;
      from each of the different ones of the respective assertion agents, receive one or more assertions that indicate that a corresponding portion of the specification is met or is not met in the performance of the at least one respective task at the respective distributed system component for the distributed system; and
      store the received one or more assertions from each of the different ones of the respective assertion agents in order to verify compliance with the specification.

2. The system of claim 1, wherein the different ones of the respective specification assertion agents for each of the different components are configured to:
   receive the at least some specification;
   verify compliance of the at least one task with regard to the corresponding portion of the specification in order to determine the one or more assertions indicating that the corresponding portion of the specification is met or is not met in the performance of the at least one respective task at the respective distributed system component for the distributed system;
   in response to said verifying, send the one or more assertions to the dynamic specification manager to be stored.

3. The system of claim 1, wherein the dynamic specification manager is further configured to:
   in response to receipt of a request for a compliance report:
      access the data store maintaining assertions indicating whether a portion of the specification is met or is not met;
      generate the compliance report based, at least in part, on said access; and
      provide the compliance report in response to the request.

4. The system of claim 1, wherein the dynamic specification manager is configured to:
   receive one or more requests to update a particular one or more portions of the specification;
   update the particular one or more portions of the specification according to the one or more requests; and
   perform said providing, said receiving and said storing with regard to the updated particular one or more portions of the specification.

5. A method, comprising
performing, by one or more computing devices:
   maintaining a specification for a distributed system, wherein the specification is maintained in a machine-readable format, wherein the distributed system comprises a plurality of different system components configured to perform at least one respective task for the distributed system, wherein a respective specification assertion agent is implemented for each of the plurality of different system components;
   for each of a plurality of requests from different ones of the respective specification assertion agents for the plurality of different system components, providing at least some of the specification to the requesting specification assertion agent;
   from each of the different ones of the respective assertion agents, receiving one or more assertions indicating that a corresponding portion of the specification is met or is not met in the performance of the at least one respective task at the respective distributed system component for the distributed system; and storing the one or more assertions from each of the different ones of the respective assertion agents in order to verify compliance with the specification.

6. The method of claim 5, wherein the one or more computing devices implement a dynamic specification manager for the distributed system, and wherein the method further comprises:

performing, by at least one other computing device implementing one of the different ones of the respective assertion agents:

sending the request to the dynamic specification manager for the specification;

receiving the at least some specification;

verifying compliance of the at least one task with regard to the corresponding portion of the specification in order to determine the one or more assertions indicating that the corresponding portion of the specification is met or is not met in the performance of the at least one respective task at the respective distributed system component for the distributed system;

in response to said verifying, sending the one or more assertions to the dynamic specification manager to be stored.

7. The method of claim 5, further comprising:

in response to receiving a request for a compliance report:

evaluating the stored one or more assertions with regard to the specification;

generating the compliance report based, at least in part, on said evaluation; and providing the compliance report in response to the request.

8. The method of claim 7, wherein said generating the compliance report comprises generating a human-readable version of the specification, wherein portions of the specification that are met are visually indicated in a manner distinct from a visual indication for those portions of the specification that are not met.

9. The method of claim 5, further comprising:

evaluating the stored one or more assertions with regard to the specification in order to identify a particular one or more portions of the specification that are not met; and in response to identifying the particular one or more portions of the specification that are not met, providing a failure notification to one or more distributed system administrators indicating the particular one or more portions of the specification that are not met.

10. The method of claim 5, further comprising evaluating the stored one or more assertions with regard to the specification in order to identify one or more distributed system components for which no assertions as to compliance with the specification have been made.

11. The method of claim 5, further comprising:

receiving one or more requests to update a particular one or more portions of the specification;

updating the particular one or more portions of the specification according to the one or more requests; and performing said providing, said receiving and said storing with regard to the updated particular one or more portions of the specification.

12. The method of claim 11, further comprising:

in response to updating the particular one or more portions of the specification, sending a notification to each of the respective specification assertion agents for the plurality of distributed system components.

13. The method of claim 5, wherein the distributed system is implemented as a network-based service in a provider network, wherein at least one of the distributed system components is a different network-based service implemented as part of the same provider network.

14. A non-transitory, computer-readable storage medium, storing program instructions that when executed by one or more computing devices cause the one or more computing devices to implement:

maintaining a specification for a distributed system, wherein the specification is maintained in a machine-readable format, wherein the distributed system comprises a plurality of different system components configured to perform at least one respective task for the distributed system, wherein a respective specification assertion agent is implemented for each of the plurality of different system components;

for each of a plurality of requests from different ones of the respective specification assertion agents for the plurality of different system components, providing at least some of the specification to the requesting specification assertion agent;

from each of the different ones of the respective assertion agents, receiving one or more assertions indicating that a corresponding portion of the specification is met or is not met in the performance of the at least one respective task at the respective distributed system component for the distributed system; and storing the one or more assertions from each of the different ones of the respective assertion agents in order to verify compliance with the specification.

15. The non-transitory, computer-readable storage medium of claim 14, wherein the one or more computing devices implement a dynamic specification manager for the distributed system, wherein the dynamic specification manager implements a network-based interface, and wherein the program instructions cause the one or more computing devices to further implement:

in response to receiving a request for a compliance report at the dynamic specification manager via the network-based interface:

evaluating the stored one or more assertions with regard to the specification;

generating the compliance report based, at least in part, on said evaluation; and providing the compliance report via the network-based interface in response to the request.

16. The non-transitory, computer-readable storage medium of claim 15, wherein the program instructions cause the one or more computing devices to implement:

receiving a request via the network-based interface to update the specification with a new specification to be maintained for the distributed system for which compliance of the plurality of distributed system components is to be verified; and performing said providing, said receiving and said storing with regard to the new specification.

17. The non-transitory, computer-readable storage medium of claim 16, wherein the program instructions cause the one or more computing devices to further implement:

in response to receiving the request to update the specification to the new specification to be maintained, sending a notification of the new specification to each of the respective specification assertion agents for the plurality of distributed system components.

18. The non-transitory, computer-readable storage medium of claim 14, wherein the program instructions cause the one or more computing devices to further implement:
- evaluating the stored one or more assertions with regard to the specification in order to identify a particular one or more portions of the specification that are not met; and
- in response to identifying the particular one or more portions of the specification that are not met, providing a failure notification to one or more distributed system administrators indicating the particular one or more portions of the specification that are not met.

19. The non-transitory, computer-readable storage medium of claim 14, wherein said providing, said receiving and said storing are performed asynchronously with regard to individual communications from the respective assertion agents for the plurality of distributed system components.

20. The non-transitory, computer-readable storage medium of claim 14, wherein the distributed system is implemented as a virtual compute service that is part of a provider network, wherein at least one of the plurality of different components is another service that is part of the same provider network.

\* \* \* \* \*